(12) United States Patent
Byford et al.

(10) Patent No.: US 9,707,982 B1
(45) Date of Patent: Jul. 18, 2017

(54) RAILCAR BEARING AND WHEEL MONITORING SYSTEM

(71) Applicants: Leo Byford, Tulsa, OK (US); Kenneth Zweiacher, Owasso, OK (US)

(72) Inventors: Leo Byford, Tulsa, OK (US); Kenneth Zweiacher, Owasso, OK (US)

( * ) Notice: Subject to any disclaimer, the term of this patent is extended or adjusted under 35 U.S.C. 154(b) by 6 days.

(21) Appl. No.: 14/808,449

(22) Filed: Jul. 24, 2015

Related U.S. Application Data

(60) Provisional application No. 62/028,614, filed on Jul. 24, 2014.

(51) Int. Cl.
*B61K 9/04* (2006.01)
*B61F 15/20* (2006.01)
*B60B 27/00* (2006.01)
*B61K 9/12* (2006.01)
*G01M 17/10* (2006.01)

(52) U.S. Cl.
CPC ............ *B61K 9/04* (2013.01); *B60B 27/0068* (2013.01); *B61F 15/20* (2013.01); *B61K 9/12* (2013.01); *G01M 17/10* (2013.01)

(58) Field of Classification Search
CPC .................................. B61K 9/04; B61F 15/20
USPC ........................................................ 73/432.1
See application file for complete search history.

(56) References Cited

U.S. PATENT DOCUMENTS

| 2007/0255509 | A1* | 11/2007 | LeFebvre | B61F 5/305 702/33 |
| 2008/0137062 | A1* | 6/2008 | Holton | G01S 17/88 356/28 |
| 2010/0204857 | A1* | 8/2010 | Forrest | B61L 27/0094 701/19 |
| 2011/0035093 | A1* | 2/2011 | Moench | G01P 3/366 701/31.4 |

FOREIGN PATENT DOCUMENTS

| AT | EP 2131167 A1 * | 12/2009 | ........... G01G 19/042 |
| KR | 101130798 B1 * | 3/2012 | |

* cited by examiner

*Primary Examiner* — Lisa Caputo
*Assistant Examiner* — Jamel Williams
(74) *Attorney, Agent, or Firm* — GableGotwals

(57) ABSTRACT

A system which eliminates the need for wayside monitoring of railcar wheel bearings and wheels includes a temperature sensor located on the railcar in close proximity to the bogie; a measuring laser located on the railcar in close proximity to the bogie and arranged to monitor breakage; a power source for the temperature sensor and the measuring laser; and a wireless transmitter to transmit the data collected by the temperature sensor and the measuring laser.

3 Claims, 3 Drawing Sheets

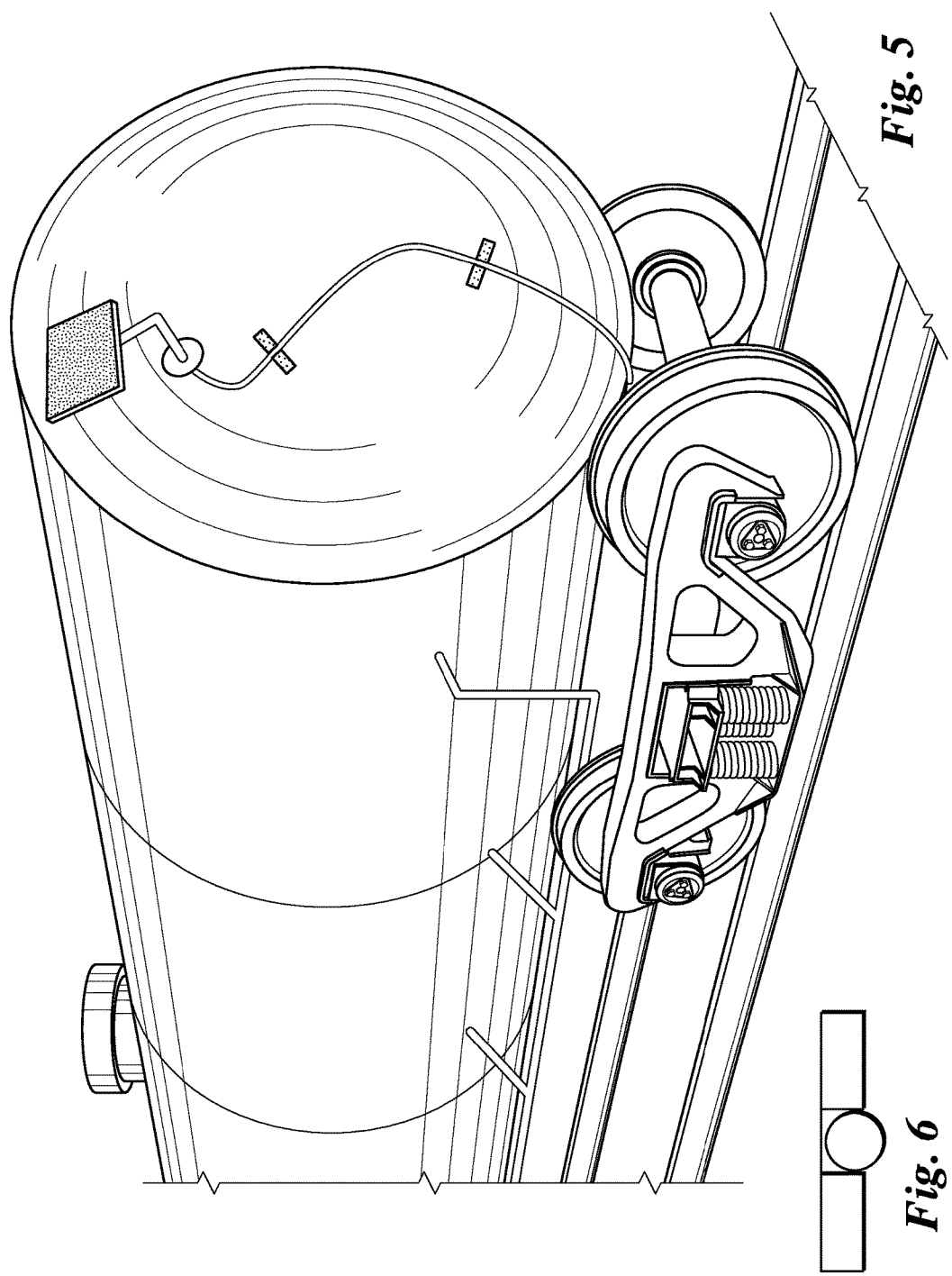

RAILCAR BEARING AND WHEEL MONITORING SYSTEM

CROSS-REFERENCE TO PENDING APPLICATIONS

This application claims priority to U.S. Prov. Pat. Appl. Ser. No. 62/028,614, filed Jul. 24, 2014, the content of which is hereby incorporated by reference.

BACKGROUND OF THE INVENTION

This invention generally relates to systems and devices used to monitor the condition of railcar components when in use. More specifically, the invention relates to systems used to monitor the condition of railcar wheel bearings and wheel conditions.

Current systems to monitor railcar wheel bearings and wheel conditions are located at wayside stations. A need exists for onboard, continuous monitoring of the bearings and wheels.

SUMMARY OF THE INVENTION

A system made according to this invention continuously monitors bearing temperature and wheel surface condition. The system includes a button contact sensor for sensing wheel bearing temperature and a measuring laser for detecting wheel breakage. Each sensor is in communication with a receiver/transmitter and is mounted to the railcar by way of a friction lock magnetic mounting. A solar panel provides power to the components.

BRIEF DESCRIPTION OF THE DRAWINGS

FIG. 5 is an alternate mounting for the power source.

FIG. 6 is an enlarged view of a powerline hold-down clip of FIG. 5.

DETAILED DESCRIPTION OF THE PREFERRED EMBODIMENTS

Figure 1:
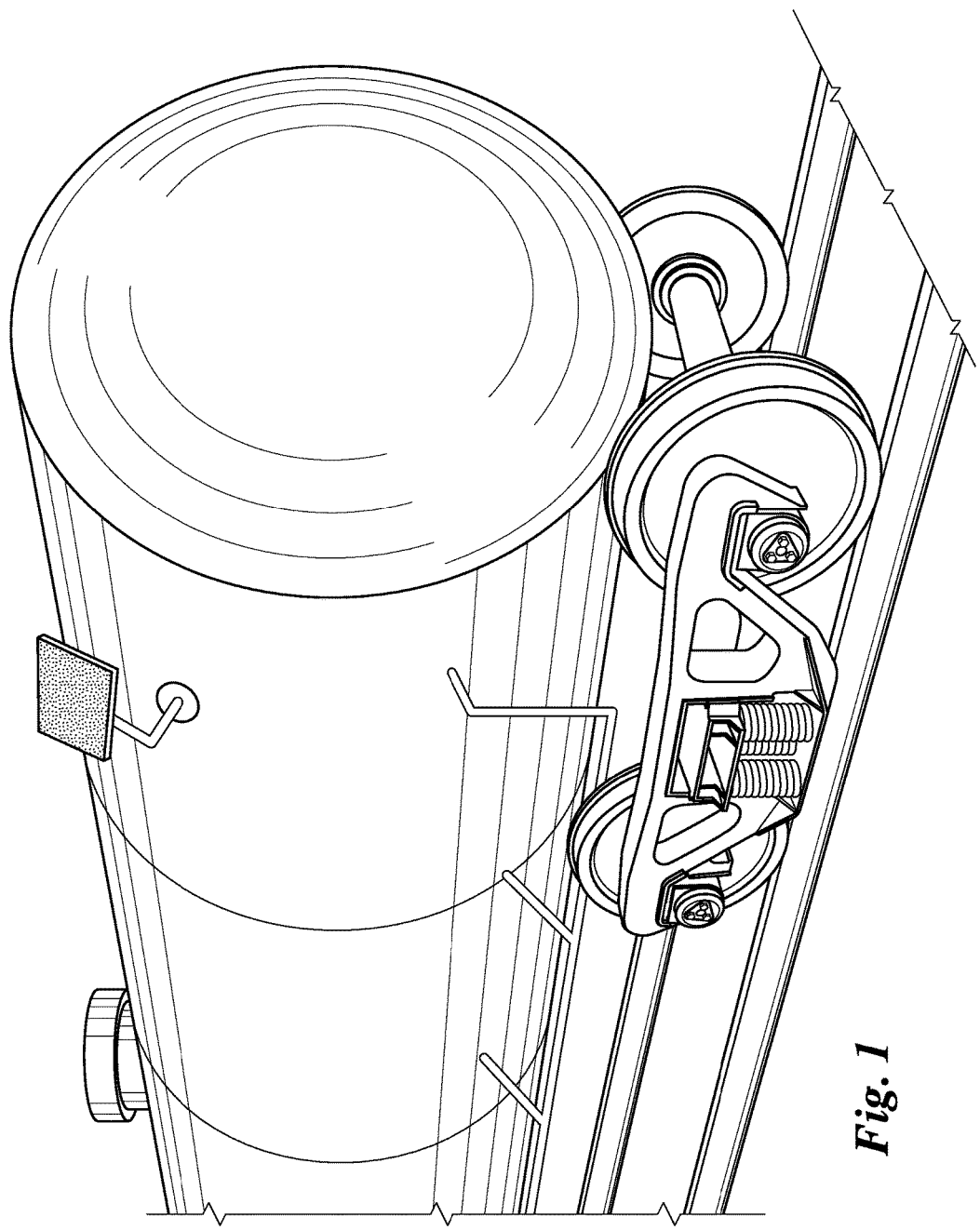
FIG. 1 is an isometric view of an embodiment of the system mounted to a railcar.
Figure 2:
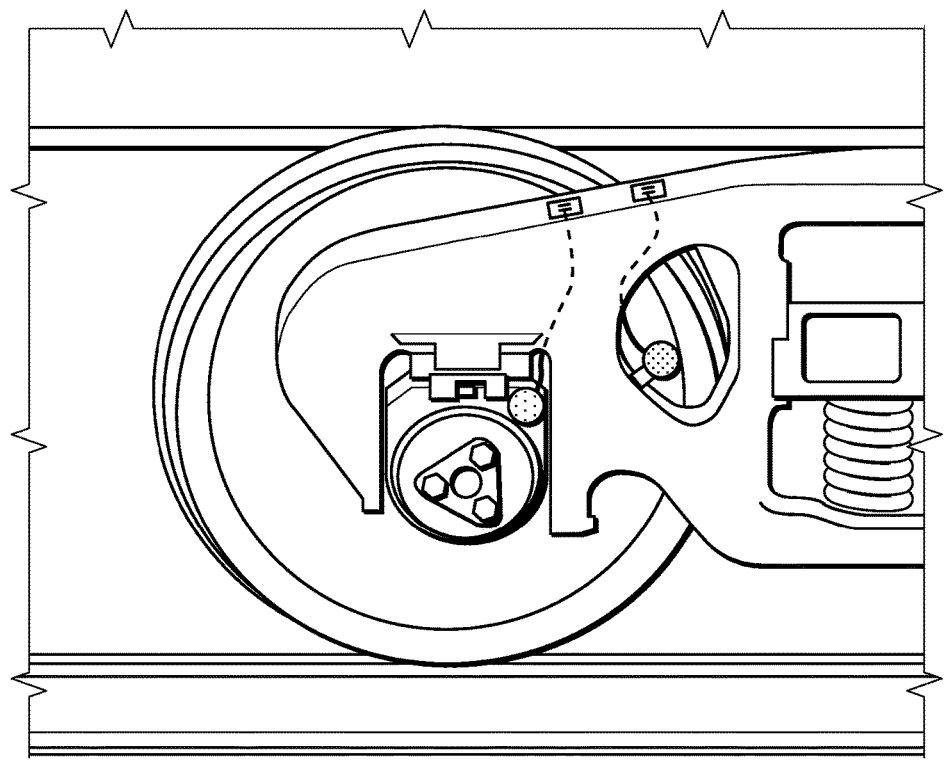
FIG. 2 is an isometric view of an an embodiment mounted to a bogie or wheel of a railcar.
Figure 3:
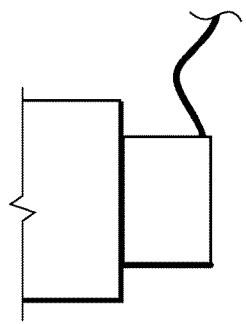
FIG. 3 is an enlarged view of the temperature sensor of FIG. 2.
Figure 4:
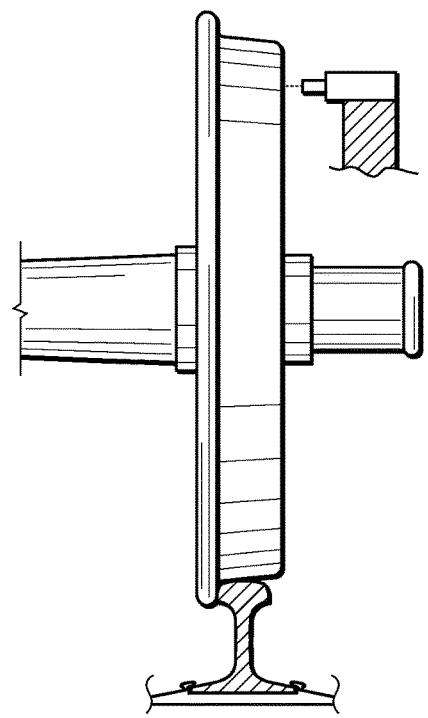
FIG. 4 is an enlarged view of the measuring laser of FIG. 2.

Referring to FIGS. 1 to 6, embodiments of the a system continuously monitor bearing temperature and wheel surface condition of a railcar bogie or wheel and transmits the temperature and surface conditions to the engineer's laptop.

Bearing temperature is monitored using a button contact sensor located on the railcar in close proximity to the wheel, preferably on the wheel bearing cover box. Wheel condition is monitored using a measuring laser located on the railcar in close proximity to the wheel, preferably on the bogie rail. Each sensor is in communication with a receiver/transmitter and is mounted to the railcar by way of a friction lock magnetic mounting. A solar panel provides power to the components.

Providing power to the sensors and receiving and transmitting data collected by the sensors are done by means well known in the art. For example, the button contact sensor, measuring laser, and wireless transmitter are available through Omega Engineering, Inc. (Stamford, Conn.). The data collected by the temperature sensor and measuring laser are compared to predefined operating parameters to determine whether the bogie is in a safe or unsafe condition.

What is claimed is:

1. A railcar bogie continuous monitoring system comprising:
    a button contact temperature sensor located on a railcar wheel bearing cover box of a railcar wheel;
    a wheel breakage measuring laser located on a railcar bogie rail of the railcar wheel and directed horizontally toward a face of the railcar wheel;
    means for powering the button contact temperature sensor and the wheel breakage measuring laser; and
    means for wirelessly transmitting data collected by the button contact temperature sensor and the wheel breakage measuring laser;
    wherein the railcar wheel bearing cover box and the railcar bogie rail is for a same wheel of a railcar.

2. A railcar bogie continuous monitoring system according to claim 1 further comprising the button contact temperature sensor including a friction lock magnetic mounting.

3. A railcar bogie continuous monitoring system according to claim 1 further comprising the wheel breakage laser including a friction lock magnetic mounting.

* * * * *